May 20, 1924.

F. A. KRUSEMARK

CUSHION TIRE

Original Filed Feb. 1, 1921  2 Sheets-Sheet 1

1,495,083

Inventor
Frederick A. Krusemark
By Davis & Davis
Attorneys

May 20, 1924.  1,495,083

F. A. KRUSEMARK

CUSHION TIRE

Original Filed Feb. 1, 1921   2 Sheets-Sheet 2

Inventor
Frederick A Krusemark
By Davis & Davis
Attorneys

Patented May 20, 1924.

1,495,083

UNITED STATES PATENT OFFICE.

FREDERICK A. KRUSEMARK, OF ROANOKE, VIRGINIA, ASSIGNOR, BY MESNE ASSIGNMENTS, TO L. A. CLARK, OF ROANOKE, VIRGINIA.

CUSHION TIRE.

Application filed February 1, 1921, Serial No. 441,643. Renewed October 19, 1923.

*To all whom it may concern:*

Be it known that I, FREDERICK A. KRUSEMARK, a citizen of the United States of America, and a resident of Roanoke, county of Roanoke and State of Virginia, have invented certain new and useful Improvements in Cushion Tires, of which the following is a full and clear specification.

This invention relates to demountable cushion tires and its main object is to provide simple means whereby a tire considerably wider than the wheel-rim may be attached to the rim, it being desirable in some cases to thus employ a tire wider than the rim for the purpose of obtaining the desired strength at the base, as standard demountable rims are comparatively narrow, as more fully hereinafter set forth.

In the drawing—

Figure 1:
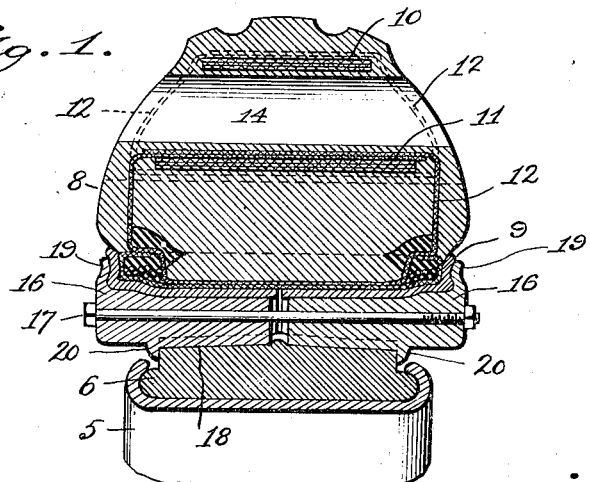
Fig. 1 is a transverse section of a tire constructed in accordance with my invention.
Figure 2:
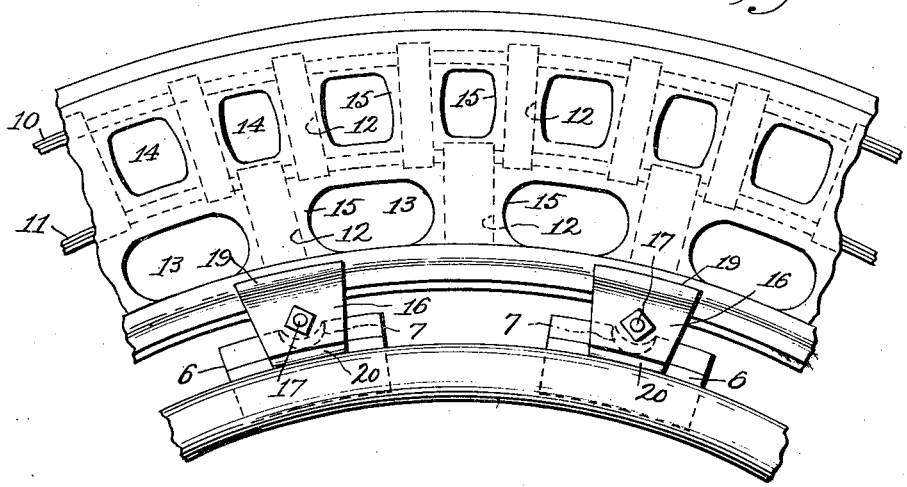
Fig. 2 is a side elevation thereof.
Figure 3:
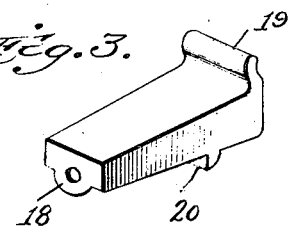
Figs. 3 and 4 are views of details hereinafter described.
Figure 4:
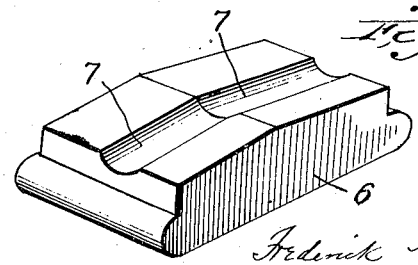

In the drawing, 5 designates the usual wheel-rim. Set within the flanges of this rim, at spaced points around the same, is a series of rubber blocks 6 whose ends are rounded to snugly fit within the outcurled edges of the rim. The outer surface of each block inclines from its outer ends outwardly to a central ridge, and each inclined surface is provided with a central groove 7, these grooves being virtually a single groove inasmuch as they merge at the ridge.

The cushion tire 8 is set in a flanged metallic rim 9, being demountably mounted therein, substantially in the manner of a straight-side tire, altho the tire may be permanently affixed to said auxiliary rim 9 in any of the usual ways. I prefer employing the type of tire illustrated and described in my two copending applications serially numbered 430,437 and 430,438, filed December 13, 1920. In this form of tire, I embed two series of circumferential bands 10 and 11 and connect these bands by a multiplicity of transverse fabric loops 12, these loops being made of cord-fabric in which the cord runs longitudinally of the loops, i. e., transversely of the tire in the top and bottom members of the loops and radially of the tire at the ends, near the side walls of the tire, these cord-bands being arranged alternately with reference to the inner series of transverse passages 13 and the outer series of transverse passages 14, each band being thereby positioned in a pillar-like mass of rubber 15 between each adjacent pair of openings. In the present structure, the inner series of openings 13 are each made longer, circumferentially, than the outer series of openings 14, and there are twice as many openings in the outer series as in the inner series, to thereby increase ventilation of the outer zone of the tire and also augment the resiliency or liveliness of the tire. Each alternate one of the outer series of openings 14 is located on a radial line with respect to the mid-length of the adjacent inner opening 13, and the two adjacent openings 14 are located radially in line with the pillar-masses which flank each opening 13, whereby the load strains are distributed as equally as possible. The openings 14 radially in line with the openings 13 are wider than the adjacent openings 14.

It will be observed that the auxiliary rim 9 is wider than the usual wheel-rim 5, whereby I am enabled to employ a tire carcass considerably wider than the wheel-rim, to thereby strengthen the tire at the base, so that larger openings 13 and 14 can be used, to thus give greater resiliency. If large openings were used on a narrow base, the lateral support of the tire would be so weakened that when mounted on a car the side-sway resulting would be very damaging not only to the tire, but also in the way of making it difficult to control the car.

The tire is secured to the cushion anchoring-blocks 6 by means of pairs of clamps 16 which are removably wedged into the space between the auxiliary rim 9 and the blocks 6 by means of a bolt 17 extending longitudinally through the clamp-blocks, on a line parallel with the body of the wheel-rim. The inner faces of the clamps fit against the outer inclined faces of the blocks 6 and their outer faces are shaped to fit the straight or slightly convex body-part of auxiliary rim 9; and there is additionally formed on the inner side of each clamp a longitudinal rib 18 which fits in one of the grooves 7 of the cushion block, to thereby lock the clamps and the cushion-blocks together against independent circumferential movement on the rim. Each clamp is provided with a radial lug 19 at its outer end to engage against the side face of the flange of the auxiliary rim, and each clamp is also provided on its inner side with a radially-extending lug 20 which engages against the adjacent end of the cushion-blocks 6. In this manner, the auxiliary rim is tightly anchored to the series of cushion-blocks 6 arranged around the tire, and this anchoring means, as is obvious, is of such construction as to permit the tire to be readily demounted from the wheel-rim.

The outer faces of the clamp-blocks 16 are, as stated, shaped to fit the inner face of the rim 9, and generally this will be substantially flat. The inner faces of these clamp-blocks 16 are approximately flat, altho, as shown, they may be slightly inclined. In any case, the inner faces of the blocks 16 and the outer faces of the rubber blocks 6 will be so shaped that when the blocks 16 are drawn together by the bolt or other means, the effect will be not only to clamp the rim 9 between the radial flanges 19 and the rubber blocks 6 endwisely between the lugs 20, but also to squeeze or compress the rubber blocks into the rim 5 and thus anchor the tire to the rim in a practical efficient way. These rubber blocks 6 in addition, of course, serve to add resiliency to the tire, but their principal function is to afford a simple way of anchoring the tire demountably to the rim, the compressing of the blocks into the rim serving effectually to frictionally prevent the blocks from having any circumferential movement on the wheel-rim.

Figure 5:
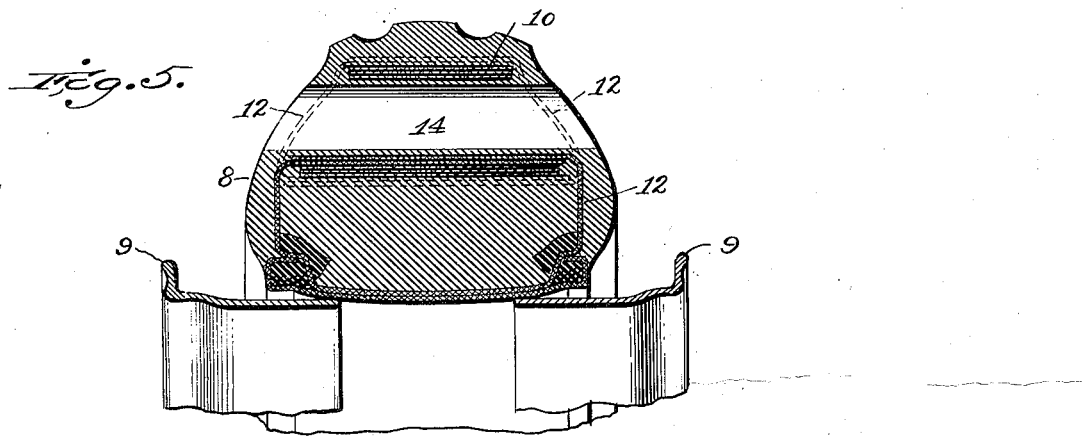
Figs. 5 and 6 are sectional views showing the tire being assembled.
Figure 6:
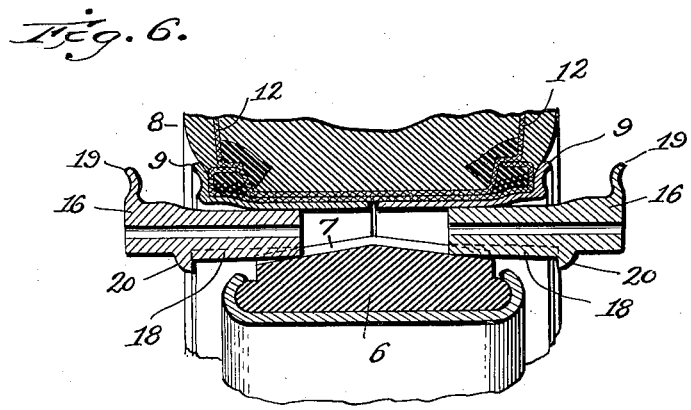

In assembling the tire, the tire proper is first clamped within the rim 9, this rim being split centrally, and this clamping is done preliminarily by means of a small press or a series of C-clamps (not shown), and while thus temporarily clamped it is placed around the wheel-rim; then the clamp-blocks 16 are put in place, after which the temporary clamping press or clamps may be removed. When the split rim sections 9 are thus drawn together upon the tire, they laterally compress the tire mass. This tends to bulge the inner face of the tire inwardly against the rim sections. This inner face of the tire is normally convexed, as shown in Fig. 5. Now, the result of thus forcing this convexed inner face of the tire against the rim is to not only assist in anchoring the tire mass to the rim, but also, and more important, results in causing a central circumferential outward bulging of the tire mass, thereby bringing about a final stretching of the circumferential cord-bands 10 and 11. These cord-bands 10 and 11 are, of course, stretched tightly when the tire is built, but even with the greatest care there is a possibility of a little slackness here and there after the tire is cured; this circumferential bulging of the tire mass when it is put on the rim subjects the circumferential bands to increased tautness and thus not only greatly improves the tire but absolutely ensures all slackness being taken up, ensuring a constant outward force of the band members in a way similar to the pressure exerted by the air on the carcass of a pneumatic tire.

The nature and scope of the invention having been thus indicated and its preferred embodiment having been specifically described, what is claimed as new is:

1. The combination with a wheel-rim, of a tire having a tire rim, and means for detachably mounting said tire rim on said wheel rim, said means embodying resilient spaced blocks attached to the wheel-rim and having oppositely-inclined outer faces, clamp-blocks arranged in pairs and adapted to fit between said inclined faces and the inner face of the tire-rim, and a device for drawing each pair of clamp-blocks together, the clamp-blocks and the supporting blocks of the wheel-rim being provided with interlocking ribs and grooves.

2. In combination, a wheel-rim having its edges curled to form internal annular channels, a series of spaced rubber blocks set within said curled edges and having laterally-extending beads engaging under said curled edges, a tire-rim and means for anchoring the same to the outer faces of said rubber blocks, said means serving to compress the rubber blocks into the channels and thus anchor them therein against circumferential as well as radial movement.

In testimony whereof I hereunto affix my signature.

FREDERICK A. KRUSEMARK.